United States Patent [19]

Sjoberg

[11] Patent Number: 5,318,079
[45] Date of Patent: Jun. 7, 1994

[54] DEVICE FOR AUTOMATIC COLLECTION, INTERMEDIATE STORAGE AND EMPTYING OF BLOOD FROM SLAUGHTER ANIMALS

[75] Inventor: John Sjoberg, Smygehamn, Sweden

[73] Assignee: ANITEC - John Sjoberg AB, Malmo, Sweden

[21] Appl. No.: 952,846

[22] Filed: Nov. 24, 1992

[30] Foreign Application Priority Data

May 25, 1990 [SE] Sweden .................... 9001889-6

[51] Int. Cl.$^5$ .................... B65B 1/30; B65B 3/26
[52] U.S. Cl. .................... 141/83; 141/163; 141/168; 141/181; 141/91; 414/418; 452/67
[58] Field of Search .................... 141/83, 85, 89, 93, 141/163, 165, 168, 170, 180, 181, 91, 92, 93; 198/703, 795, 465.5; 452/67, 177, 181, 183, 198; 414/332, 418

[56] References Cited

U.S. PATENT DOCUMENTS

| | | | |
|---|---|---|---|
| 1,597,929 | 8/1926 | Sjolander et al. | 17/24 |
| 2,750,091 | 6/1956 | Mattimoe et al. | 141/89 |
| 3,610,398 | 10/1971 | Rice | 198/33 |
| 3,831,645 | 8/1974 | Golding et al. | 141/92 |
| 4,090,275 | 5/1978 | Jorgensen et al. | 452/183 |
| 4,617,700 | 10/1986 | Batorfalvi et al. | 452/183 |
| 4,735,238 | 4/1988 | Reeves, Jr. | 141/83 |
| 4,972,937 | 11/1990 | Aarts | 198/795 |

FOREIGN PATENT DOCUMENTS

| | | |
|---|---|---|
| 870957 | 3/1953 | Fed. Rep. of Germany . |
| 2618237 | 11/1977 | Fed. Rep. of Germany . |
| 2419088 | 9/1978 | Fed. Rep. of Germany . |
| 3641594 | 6/1987 | Fed. Rep. of Germany . |
| 430150 | 10/1983 | Sweden . |

OTHER PUBLICATIONS

A1, 90/14013, (ANITEC—John Sjoberg AB), Nov. 29, 1990.

Primary Examiner—Henry J. Recla
Assistant Examiner—Steven O. Douglas
Attorney, Agent, or Firm—Cushman, Darby & Cushman

[57] ABSTRACT

A device for automatic collection, intermediate storage and emptying of blood from slaughter animals, comprising an endless track (2), a number of containers (3) movable along the track and a filling station (4) and an emptying and washing station (5) which are arranged along the track. The containers are loosely arranged in relation to each other and to the track (2). As a result, the weighing (6) of a filled container can be carried out effectively immediately after the filling operation. Moreover, containers can temporarily be switched out from the normal path of progression along the track into and from a resting station.

5 Claims, 6 Drawing Sheets

DEVICE FOR AUTOMATIC COLLECTION, INTERMEDIATE STORAGE AND EMPTYING OF BLOOD FROM SLAUGHTER ANIMALS

BACKGROUND OF THE INVENTION

The present invention relates to a device for automatic collection, intermediate storage and emptying of blood from slaughter animals, this device having an endless track, a number of containers movable along the track, a filling station and an emptying and washing station which are arranged along the track.

In slaughter-houses, slaughter animals which have been anaesthetised or put to death are conveyed successively in a hanging or lying state in a slaughtering line. A so-called sticker sticks a hollow knife into the animal's neck for withdrawal of blood. The blood is conducted to a vessel connected to the knife, e.g. in a sticking carrousel, as described in assignees International Patent Application PCT/SE89/00284. When the withdrawal of blood is completed, the blood is conducted from the vessel in the sticking carrousel to a larger intermediate vessel in an intermediate storage device. In the intermediate vessel, blood from a limited number of animals, usually 30-40 animals, is stored intermediately. Alternatively, the blood can be conducted from the sticking knife directly to the intermediate vessel.

Each slaughter animal is provided with a batch code which corresponds to a code on each intermediate vessel. Blood from a certain animal can thus be traced to a certain intermediate vessel. Alternatively other batch-distinguishing identifying systems can be used.

After the sticking operation, the slaughter animal is conveyed to a veterinary inspection station in which the veterinary inspects the animal. When an intermediate vessel has been moved to the emptying station, and if all animals belonging to this vessel have been accepted, the blood is poured into a larger tank for accepted blood which is to be used for production of various blood products. The blood of an animal belonging to the vessel and rejected by the veterinary is poured into a tank for rejected blood.

A known automatic intermediate storage device comprises a carrousel frame with fixedly mounted intermediate vessels. The carrousel frame comprises a hub having radial arms, each supporting an intermediate vessel. The filling station and the emptying station are positioned at different locations adjacent the circuit of the vessel. There are other types of automatic devices, but they are all based on the principle of interconnected vessels in an endless, circular or oval track.

Several problems are connected with the prior art devices. First, the contents of a vessel cannot practically be weighed until the blood has been poured into a container separated from the carrousel. This is done after emptying, i.e. a relatively long time after the sticking operation. A direct feed-back to the sticker regarding the effectiveness of the blood withdrawal cannot be established. Although it would be possible to mount a weighing cell on each radial arm of the frame, this is not an economically realistic alternative. Secondly, there may be some doubt whether the blood in a vessel which is to be emptied is acceptable. If the veterinary inspecting the animal feels hesitant about this, he will discard the body from the slaughtering line so as to be able to conduct a more thorough inspection later on. If he does not find time for such a thorough inspection before the corresponding intermediate vessel is to be emptied, he is forced to reject the blood even if it appears later that the animal's body is accepted. Thirdly, the device takes up a large space. Fourthly, the device cannot be extended by including further vessels.

SUMMARY OF THE INVENTION

The object of the invention is to solve at least one of the above problems. for automatic collection, intermediate storage and emptying of blood from slaughter animals, this device having an endless track, a number of containers movable along the track, a filling station and an emptying and washing station which are arranged along the track.

The advantages of the invention will be evident from the following description of an embodiment.

BRIEF DESCRIPTION OF THE DRAWINGS

The invention will now be described hereinbelow in an embodiment with reference to the accompanying drawings

DETAILED DESCRIPTION

Figure 1:
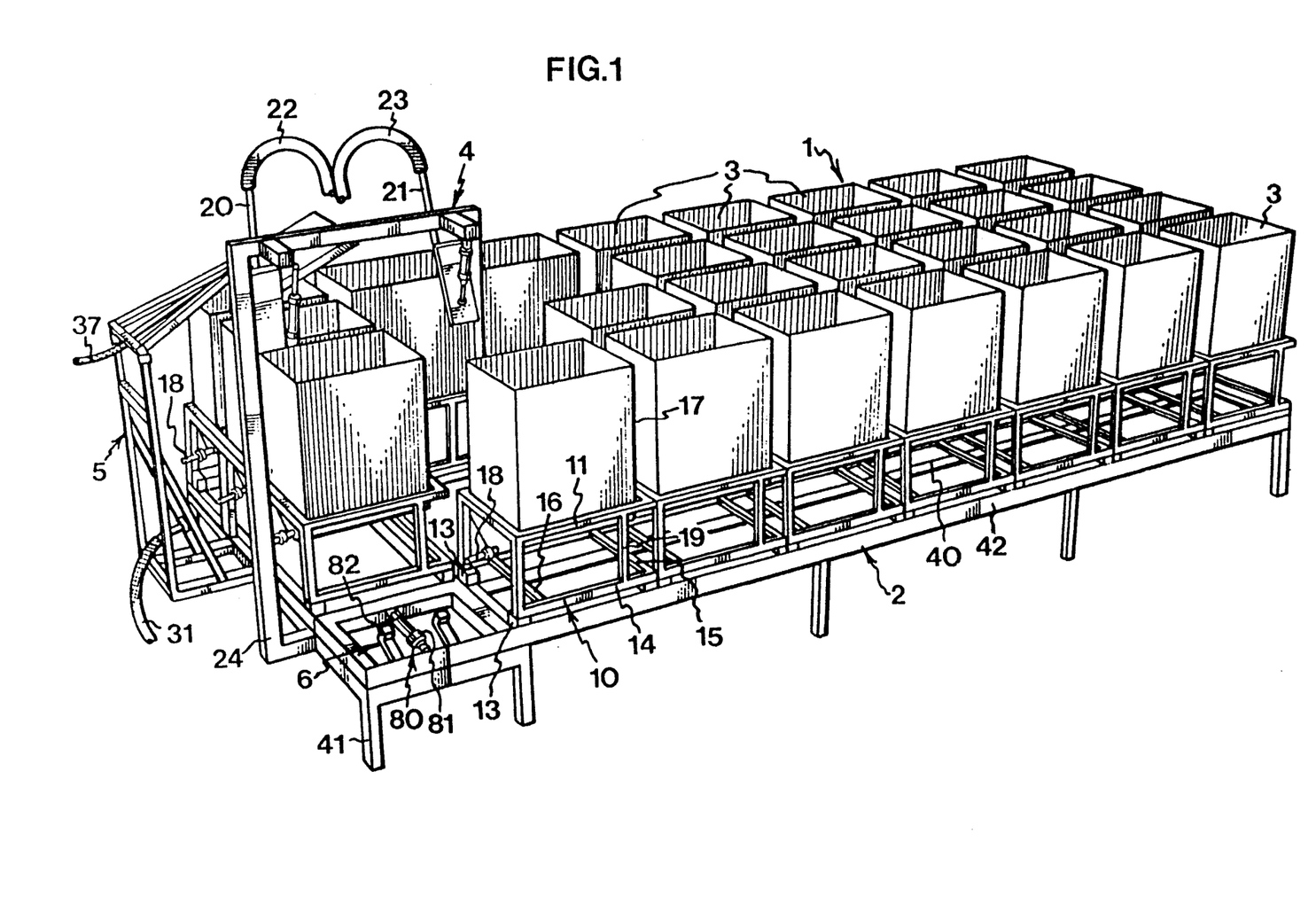
FIG. 1 is a perspective view of an intermediate storage device according to the invention.

FIG. 1 shows an intermediate storage device 1 according to the invention, comprising a sliding track 2 on which a number of intermediate containers 3 are slidingly movable in a zigzag pattern. The container is provided with a slide frame 10 which is moved on rails 40 included in the track. The track 2 is raised above the surface by means of stanchions 41. The device comprises a filling station 4, an emptying and washing station 5 and a weighing station 6. These stations are arranged adjacent each other on the track. Of course, it is also possible to arrange these stations at other locations along the track.

Figure 2:
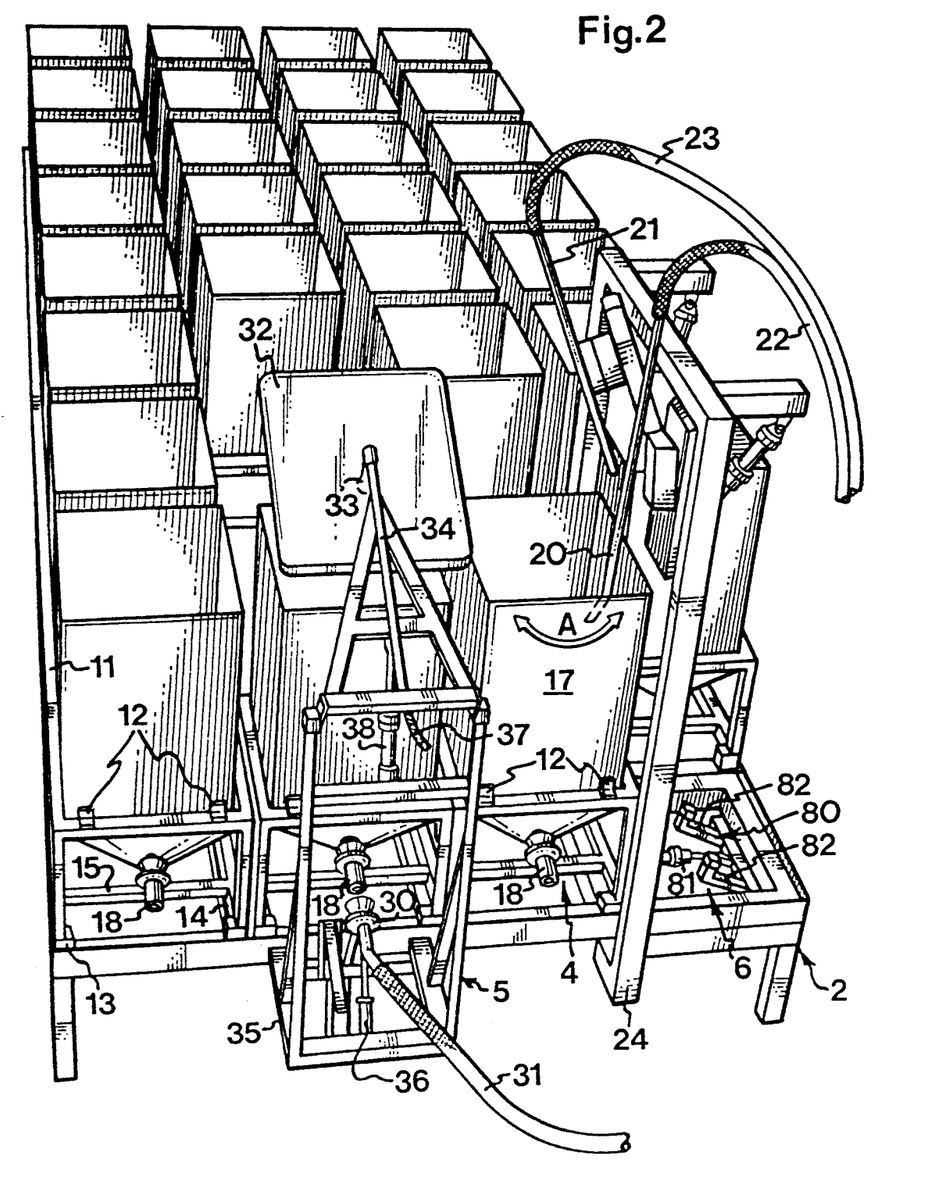
FIG. 2 is a different perspective view of the intermediate storage device in FIG. 1 and especially illustrates the filling, emptying, washing and weighing stations.

Each of the containers 3 is, as mentioned above, provided with a slide frame 10 comprising an upper frame member 11 in which a vessel 17 is positioned. The vessel is attached to the slide frame by means of angle irons 12 (FIG. 2). The slide frame further comprises a lower frame member 14 connected to the upper frame member via vertical legs 19. The lower side of the lower frame member is in each corner fitted with guide shoes 13 which are made of a low-friction material for satisfactory sliding of the containers on the rails 40. The sliding movement of the containers on the rails 40 is guided in the transverse direction by an edge 42 formed on the outside of each rail. The lower frame member has a front cross bar 15 and a rear cross bar 16 which are adapted to engage the drive means included in the track and described in more detail below.

The slide frames are constructed so as to be able to abut against each other while maintaining a spacing between the vessels 17. As the containers move along the track, one or a couple of containers are driven on each linear section of the track. The other containers are pushed forward by the driven containers.

FIG. 2 shows the filling station and the emptying-/washing station in more detail. The filling station comprises a filling frame 24 on which TWO FILLING PIPES 20 and 21 are mounted to be pivotable between an inoperative position and a filling position. When the vessel 17 of the container is positioned at the filling station 4, one of the filling pipes (in FIG. 2, the filling pipe 20) is guided to the filling position in which the filling pipe 20 is located in the vessel 17. Blood is conducted from the sticking carrousel or directly from the hollow knife via the filling hose 22. After the filling operation, the filling pipe 20 is moved to its inoperative position, whereupon the filling pipe 21 is made ready for the filling of the next container. The arrow A in the Figure indicates that the filling pipe can pivot in the direction of motion of the vessel for so-called refilling. When the filling pipes are in their inoperative position, they are cleaned in a washing device (not shown).

After being filled, the container is moved to the weighing station 6 which will be described in more detail below with reference to FIG. 6. However, FIGS. 1 and 2 show a positioning device 80 having a piston-and-cylinder assembly 81. This is adapted to pivot arms 82 into engagement with a slide frame 10 for positioning the container in the weighing station 6.

When the container has been moved along the entire track and reached the emptying and washing station, it is first emptied of blood and then cleaned. The components for carrying out these operations are mounted on a frame 35. A piston-and-cylinder assembly 36 is connected to a dock nozzle 30. To initiate the emptying operation, the nozzle 30 is connected or docked to the bottom valve 18 of the vessel. The blood is emptied via an emptying tube 31 connected to a pump (not shown). After the pump, the blood is conducted via a distribution valve to a tank for accepted or rejected blood. After emptying, the intermediate container and the docking system are washed. By activating a piston-and-cylinder assembly 38, a washing lid 32 is lowered over the container. One end of a detergent tube 34 is connected to a spray nozzle 33 on the lid lower side, and the other end is connected to a detergent hose 37 for supplying detergent. During the washing, the bottom valve 18 is connected to the dock nozzle which, via a second distribution valve, is connected to a tank for receiving the dirty detergent. After emptying and washing, the piston-and-cylinder assembly 36 is deactivated for disconnecting the dock nozzle 30 from the bottom valve 18. Upon completion of the washing, the washing lid 32 is opened so that the container can be moved to the filling station 4.

Figure 3:
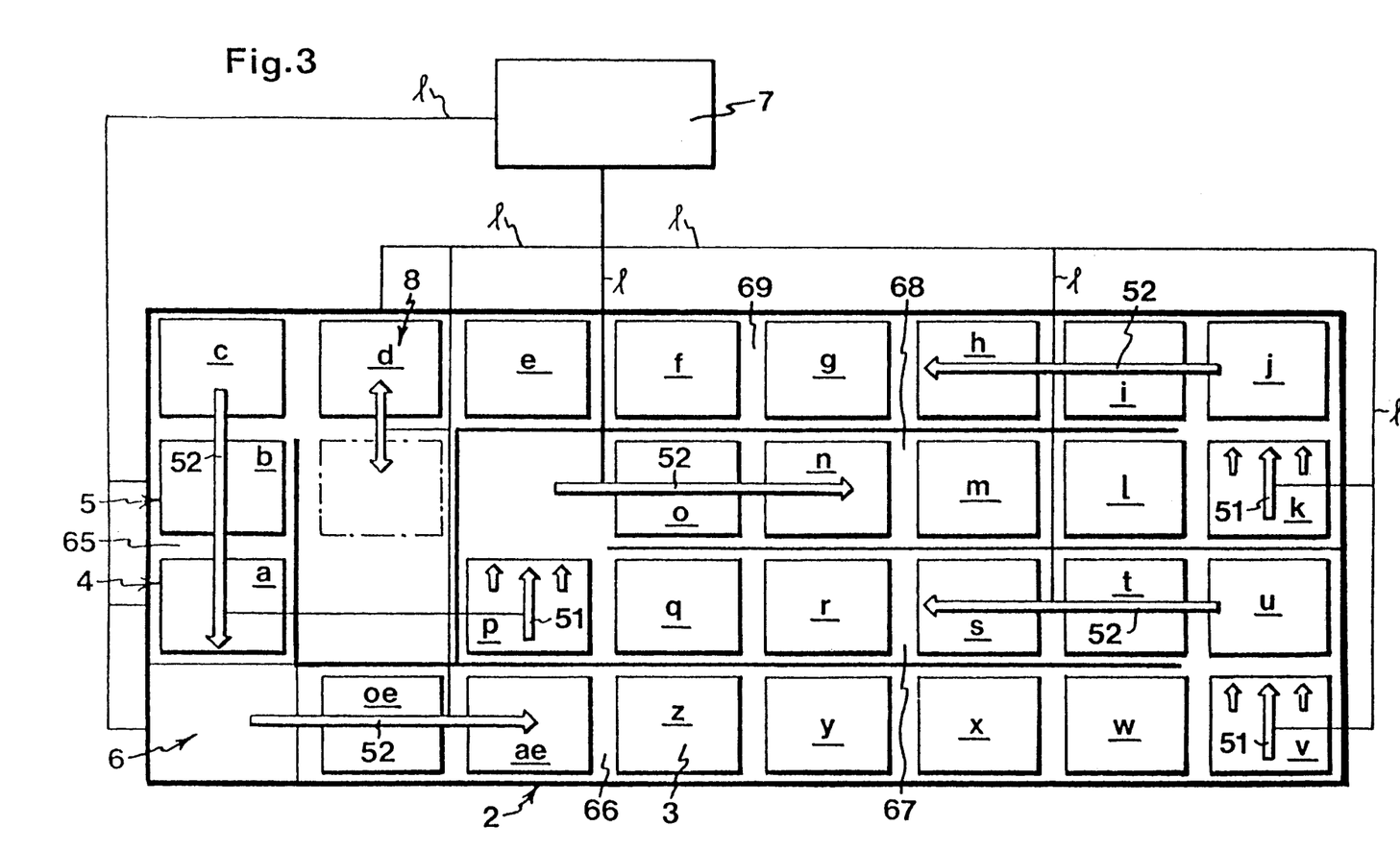
FIG. 3 schematically shows the intermediate storage device according to the invention and especially illustrates the position of the drive means for the containers and illustrates an example of the use of a switching station.

FIG. 3 schematically shows the intermediate storage device according to the invention and illustrates the essential advantages that can be obtained as compared to prior art devices.

In order to compact the device and effectively use the space occupied by the device, the track 2 on which the containers 3 are moved has been "folded" so that the containers are moved in a zigzag pattern along the track. The track consists of a number of sections 65–69. The first section 65 contains the emptying/washing station 5 and the filling station 4. The second section 66 begins with the weighing station 6 and extends at right angles to the first section 65. The third section 67 extends in parallel with the second section 66, but moves the containers in the opposite direction. The fourth section 68 extends in parallel with the second and third section 66 and 67, respectively, and moves the containers in the same direction as the second section 66. The fifth section 69 extends in parallel with the second, third and fourth section 66, 67 and 68, respectively, and moves the containers in the same direction as the third section 67. The fifth section 69 is terminated at the beginning of the first section 65. Each section has a longitudinal moving means 52 which moves a container one step along the track. By one step is meant a one-box (one-container) movement in the Figure. The other containers in the track section are pushed by the driven container, thereby moving all the containers one step. To this end, there must be at least one empty space in the track section involved. In a socalled stand-by position, the weighing station 6 and the first space in the fourth track section 68 are empty. For effecting the movements of the containers in the transverse direction, i.e. between the second and third section, between the third and fourth section, and between the fourth and fifth section, there is a transverse moving means 51 which will be described in more detail with reference to FIG. 5.

A control system 7 controls via conduits L the various stations and also the transverse and longitudinal moving means. The control system which includes a suitable microprocessor is programmed in such a manner that a desired sequence of movements of the containers and operations at the various stations can be performed.

An example of a moving sequence is shown in the Table below. The containers are designated a-oe, the vessel a in its stand-by position being at the filling station 4. The sequence is effected in four sequential phases A, B, C and D. Each step comprises two simultaneous movements at two different locations along the track 2. In the Table, the direction of motion along the track is indicated by an arrow, and during each movement, the containers are moved one step ahead.

TABLE

| Phase | Movement | Container | Direction |
|-------|----------|-----------|-----------|
| A     | 1        | a, b, c   | ↓         |
|       | 2        | p         | ↑         |
| B     | 1        | d - j     | ←         |
|       | 2        | q - u     | ←         |
| C     | 1        | k         | ↑         |
|       | 2        | v         | ↑         |
| D     | 1        | l - p     | →         |
|       | 2        | w -oe, a  | →         |

When the sequence is completed, all containers have been moved at least one step, and container b has been moved to the filling station and container c to the emptying station.

FIG. 3 also shows a switching station 8 having a transverse moving means which temporarily can switch the container to a resting position outside the track. This resting position is indicated by dash-dot lines in the Figure. In the event of the veterinary having not had time to inspect an animal belonging to a container which approaches the emptying station, he can order the switching station 8 to switch out the container to the resting position and, after the inspection, switch back the container to an active position in the track.

FIG. 3 clearly shows how flexible the intermediate storage device according to the invention is and how effectively it utilises the space in which it is located. Even if the Figure shows two empty spaces in the stand-by position, one of them can of course also be excluded and be occupied by a container.

Figure 4:
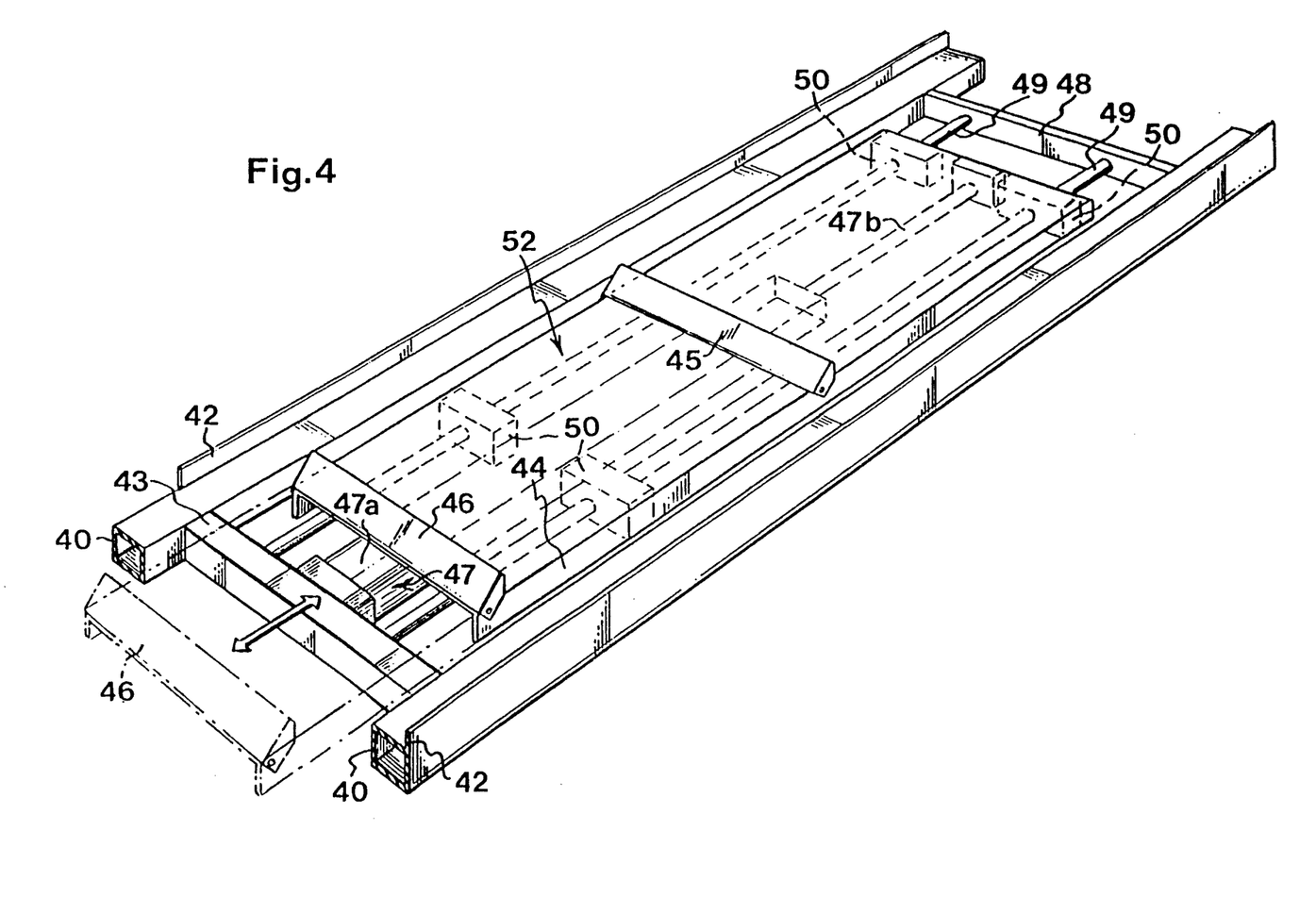
FIG. 4 shows a carriage which is reciprocable along the rails of the track and adapted to move the containers in the longitudinal direction of the track.

FIG. 4 illustrates a longitudinal moving means 52 which is mounted between two rails 40 in one of the track sections 65–69. The longitudinal moving means comprises a carriage 44 which is a U beam facing downwards. The upper side of the carriage is positioned approximately on a level with the upper side of the rails 40, on which the slide frame is moved. The carriage is driven back and forth by means of a piston-and-cylinder assembly 47 whose cylinder 47a is attached to a cross member 43 and whose piston rod 47b is connected to the lower side of the carriage. Two guide means 49 mounted each on one side of the piston-and-cylinder assembly 47 assist in guiding the movement of the carriage via guide blocks 50 which are secured to the lower side of the carriage. The containers are driven along the track by engaging means in the form of flaps 45 and 46 on the upper side of the carriage. The flaps are spring loaded by pressure springs (not shown) and, in the resting position, take the raised position shown in the Figure. In this position, the upper edge of the flaps is located above the rails 40 and can engage the lower frame member of the slide frame 10. In the rear position of the carriage, the rear flap 46 will engage the front cross bar member 15 (FIG. 1) of a container which is positioned in the first space of the track section. This rear position of the carriage 44 on the moving means is indicated by dash-dot lines. At the same time the front flap 45 engages the front cross bar of the container in front. The carriage is moved forwards a distance corresponding to the distance between two containers and pushes the two containers along this distance. The other containers positioned in this section are pushed forwards one step. The front flap 45 can be excluded, while maintaining the function of the longitudinal moving means. When the longitudinal moving means 52 should "collect" two more containers, the carriage 44 is moved backwards to the position indicated by dash-dot lines. The spring-loaded flaps 45 and 46 are pressed down by the cross bars on to the lower frame members which they pass, and are caused to snap up behind the cross bars of new containers.

FIG. 4 illustrates an embodiment of a longitudinal moving means. It is also conceivable to provide each container with a drive means controlled by the control system.

Figure 5:
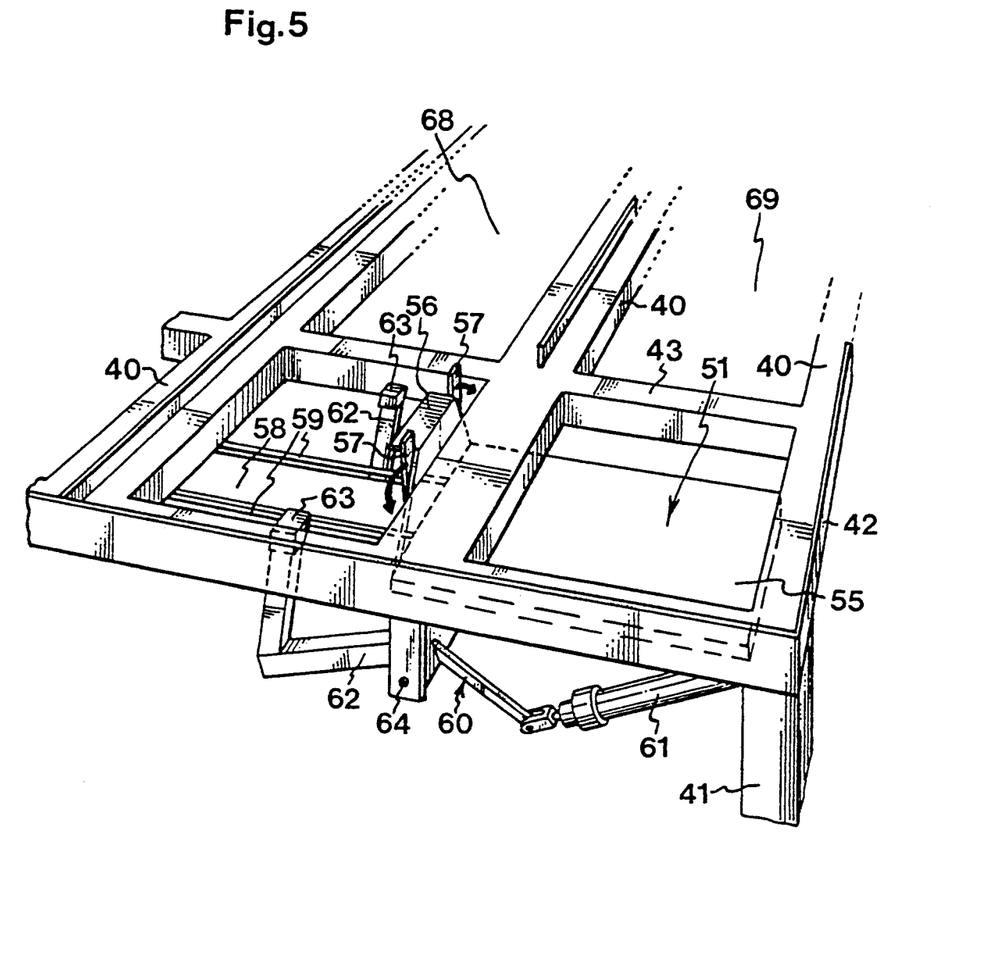
FIG. 5 shows a device for moving the containers in the transverse direction of the track.

FIG. 5 illustrates an embodiment of a transverse moving means 51 consisting of a carriage 55 of essentially the same type as the one shown in FIG. 4. Thus, the transverse moving means 51 comprises a piston-and-cylinder assembly 58 and guide means 59 for driving and guiding the carriage 55. At the rear end of the carriage, there is an upright angular plate 56 on which two folding carriers 57 are mounted. The carriers can be folded between a lower position in which they are disposed below the horizontal portion of the angular plate, and a raised position in which they project above said horizontal portion. The Figure shows the carriage in its front position.

The transverse moving means cooperates with a positioning device 60 comprising a piston-and-cylinder assembly 61 which is adapted to pivot two arms 62 into engagement with the lower frame member of a container which is positioned above the arms in the track section 68. The positioning device 60 moves the container transversely to the track section 69 a short distance which enables the carriers 57 to be raised outside the lower frame member of the container on the side of the track section 68 facing away from the track section 69. The carriage is activated to move the container transversely from the track section 68 to the track section 69. It will be appreciated that the angular plate 56 on the carriage 55 can pass freely under the lower frame member of the slide frame. The carriage 55 cannot, however, move the container all the way to the section 69. The last part of the movement is effected by the positioning device 60.

Figure 6A:
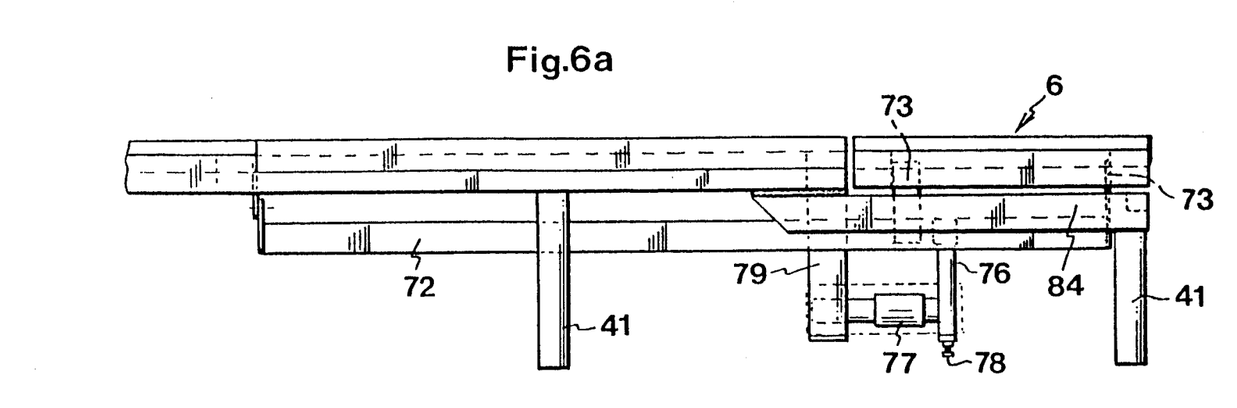
FIGS. 6a and b are a side view and, respectively, a top plan view of the part of the track containing the weighing station.
Figure 6B:
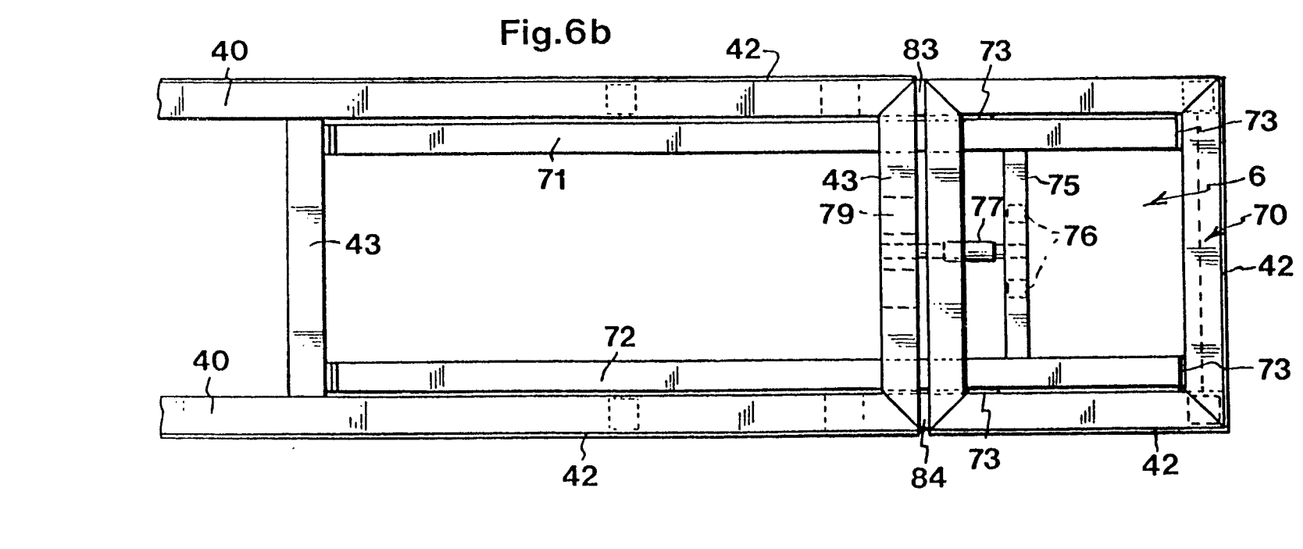

FIGS. 6a and 6b illustrate the construction of the weighing station. For better clarity, the filling station and the emptying/washing station have been excluded. The rails 40 extend up to the weighing station and terminate in a cross member 43. On a rear cross member 43, two beams 71, 72 are attached immediately inside and under one rail each. The beams 71 and 72 extend forwards and into the weighing station 6. The front ends of the beams 71 and 72 are cantilever ends and support via spacer plates 73 a scale frame 70 which is positioned on the same level as the rails of the track. This scale frame constitutes the first part of the second track section 66. Extension beams 83 and 84 are mounted on the lower side of the rails 40 and extend under the scale frame so as to terminate each in one stanchion 41. A cross beam 75 between the beams 71 and 72 supports a U-shaped load cell yoke 76. Between the load cell yoke 76 and a U-shaped bracket 79 on the lower side of the cross member 43 there is mounted a load cell 77. The load cell contains strain gauges, and when loading the scale frame 70, the load is registered by the load cell 77. The load cell is via conduits (not shown) connected to the control system.

By means of the device according to the invention, it is possible to collect in an effective manner blood from sticking carrousels or from hollow knives, directly or via pump tank systems. The non-connected containers can be weighed separately immediately after filling and be regrouped according to the veterinary inspection of the animals. Furthermore, the track can extend in a folded manner, thereby optimising the space. By leaving out the second to fifth track sections, the track can be extended and the number of containers can increase. The track is preferably made of separate parts which can readily be disconnected to allow new track sections to be added.

I claim:

1. A device for automatic collection, intermediate storage and emptying of blood from slaughtered animals, comprising:
   an endless track;
   a plurality of containers adapted to receive blood draining thereinto from respective slaughtered animals, said track includes means for moving at least one container along said track at a predetermined location, said containers being supported in abutting relationship on said endless track, whereby as said one container moves said abutting containers move therealong;
   a container filling station and a container emptying and washing station both arranged in juxtaposition with said endless track at respective sites which are separated from one another along said tRack on a path of normal intended progression of said containers; and neighboring ones of said containers being physically separable frOm one another in order to permit individual ones of said containers to be moved towards and away from one another along said track. and 2. The device of claim 1, further comprising:

a container weighing station arranged in juxtaposition with said endless track at a respective site which is located immediately downstream of said filling station and is located upstream of said container emptying and washing station on said path of normal intended progression of said containers; said weighing station including structure for separately weighing each container which has been filled at said filling station.

3. The device of claim 1, wherein:

said track further includes at least one resting station which extends from said path; and a switching structure for causing any selected individual one of said containers which is supported on said track at a particular site along said path, to be switched off said path and into said resting station and to be switched from said resting station back onto said path.

4. The device of claim 1, wherein:

said track includes parallel rails, said track is horizontal, and said structures for moving individuals of said containers are mounted for movement up between said rails to engage individuals of said containers for moving individuals of said containers.

5. The device of claim 1, wherein:

said track is horizontal and said path is arranged in a loop which includes at least two portions in which progression of individual containers is primarily longitudinal respectively in opposite directions, and at least two portions in which progression of individual containers is primarily traverse respectively in two opposite directions.

* * * * *

UNITED STATES PATENT AND TRADEMARK OFFICE
CERTIFICATE OF CORRECTION

PATENT NO. : 5,318,079
DATED : June 7, 1994
INVENTOR(S) : Sjoberg, John

It is certified that error appears in the above-indentified patent and that said Letters Patent is hereby corrected as shown below:

On the title page, item [22] should read as follows:

--[22] PCT Filed:   May 23, 1991-- and after item [22] insert the following:

-- [86] PCT No.:      PCT/SE91/00365

§ 371 Date:    November 24, 1992

§ 102(e) Date: November 24, 1992

[87] PCT Pub. No.:   WO91/18515

PCT Pub. Date: December 12, 1991--.

Signed and Sealed this

Twentieth Day of September, 1994

Attest:

BRUCE LEHMAN

*Attesting Officer*    *Commissioner of Patents and Trademarks*